(12) United States Patent
Mori et al.

(10) Patent No.: US 12,100,556 B2
(45) Date of Patent: Sep. 24, 2024

(54) CAPACITOR AND METHOD FOR MANUFACTURING SAME

(71) Applicant: NICHICON CORPORATION, Kyoto (JP)

(72) Inventors: Takashi Mori, Kyoto (JP); Masaya Yamamoto, Kyoto (JP)

(73) Assignee: Nichicon Corporation, Kyoto (JP)

(*) Notice: Subject to any disclaimer, the term of this patent is extended or adjusted under 35 U.S.C. 154(b) by 85 days.

(21) Appl. No.: 17/784,748

(22) PCT Filed: Feb. 25, 2021

(86) PCT No.: PCT/JP2021/007045
§ 371 (c)(1),
(2) Date: Jun. 13, 2022

(87) PCT Pub. No.: WO2021/172409
PCT Pub. Date: Sep. 2, 2021

(65) Prior Publication Data
US 2023/0009176 A1    Jan. 12, 2023

(30) Foreign Application Priority Data
Feb. 27, 2020 (JP) ................. 2020-031251

(51) Int. Cl.
| | |
|---|---|
| H01G 4/228 | (2006.01) |
| H01G 2/02 | (2006.01) |
| H01G 2/10 | (2006.01) |
| H01G 4/224 | (2006.01) |
| H01G 4/32 | (2006.01) |
| H01G 4/38 | (2006.01) |

(52) U.S. Cl.
CPC ............... *H01G 4/228* (2013.01); *H01G 2/02* (2013.01); *H01G 2/10* (2013.01); *H01G 4/224* (2013.01); *H01G 4/32* (2013.01); *H01G 4/38* (2013.01)

(58) Field of Classification Search
None
See application file for complete search history.

(56) References Cited

U.S. PATENT DOCUMENTS

| | | |
|---|---|---|
| 10,153,089 B2 | 12/2018 | Yang et al. |
| 10,763,482 B2 | 9/2020 | Kimura et al. |
| 2009/0040685 A1 | 2/2009 | Hiemer et al. |

(Continued)

FOREIGN PATENT DOCUMENTS

| | | |
|---|---|---|
| JP | 2002-367857 A | 12/2002 |
| JP | 2006-295997 A | 10/2006 |

(Continued)

*Primary Examiner* — Eric W Thomas
(74) *Attorney, Agent, or Firm* — Norris McLaughlin, P.A.

(57) ABSTRACT

A second busbar is provided that has a second electrode terminal and a second connection terminal. A first busbar is provided that has a first electrode terminal, a lateral side coupler, an overhang, and a first connection terminal. The first electrode terminal and/or the second electrode terminal has a protruding piece for connection (connecting protrusion). This protruding piece is elastically depressible in response to contact with an electrode surface of a capacitor element unit inserted from an opposite side of the lateral side coupler across a space between the first and second electrode terminals.

1 Claim, 15 Drawing Sheets

(56) References Cited

U.S. PATENT DOCUMENTS

2009/0059467 A1    3/2009  Grimm et al.
2019/0080850 A1*   3/2019  Inazumi .................. H01G 2/04

FOREIGN PATENT DOCUMENTS

| JP | 2008-537361 A |   | 9/2008 |
|----|---------------|---|--------|
| JP | 2011086673 A  | * | 4/2011 |
| JP | 2014-113053 A |   | 6/2014 |
| JP | 2014-154337 A |   | 8/2014 |
| JP | 2015-103777 A |   | 6/2015 |
| JP | 2017-152444 A |   | 8/2017 |
| JP | 2017-535969 A |   | 11/2017 |
| JP | 2018-182066 A |   | 11/2018 |
| JP | 2019-096713 A |   | 6/2019 |
| JP | 2019-106487 A |   | 6/2019 |
| JP | 2019-110156 A |   | 7/2019 |
| KR | 10-2017-0034955 A | | 3/2017 |

* cited by examiner

CAPACITOR AND METHOD FOR MANUFACTURING SAME

TECHNICAL FIELD

This invention relates to a capacitor including a capacitor element unit, a first busbar and a second busbar that are respectively connected to a first electrode surface on a lower end side and a second electrode surface on an upper end side of the capacitor element unit, and a coating resin that covers the whole capacitor element unit and that partly covers the first and second busbars.

BACKGROUND ART

The following is a workflow for mounting components to a soldering jig.
1) First, the first busbar to be disposed on the lower side of the capacitor is set on the soldering jig.
2) Next, the capacitor element unit is mounted to the first busbar.
3) Then, the second busbar to be disposed on the upper side of the capacitor is mounted to the capacitor element unit.

The known steps 1), 2) and 3) may be often performed to mount the first busbar, the capacitor element unit, and the second busbar to the soldering jig. These steps, however, may impose certain shape- and structure-related restrictions on capacitors to be manufactured.

In the capacitor illustrated in FIGS. 9a and 9b, a busbar B1' to be disposed on the lower side is neither so shaped nor so structured that may impose any obstruction when a capacitor element unit U is moved downward from an upper position and mounted to the capacitor. Further, the first busbar B1' and the capacitor element unit U, when they are tentatively assembled, are neither so shaped nor so structured that may impose any obstruction when a second busbar B2' is downward from an upper position and mounted to the capacitor.

However, the conventional assembling steps 1), 2) and 3); carried out in this order, may be difficult to employ in case one or both of the first and second busbars involve certain complexity in shape or structure.

An example of such capacitors may be a capacitor with the combination of a simply-structured second busbar B2 and an intricately-structured first busbar B1, as illustrated in FIGS. 10a to 10d.

The second busbar B2 is relatively simple in shape and structure and includes a second electrode terminal 21 and a second connection terminal 24. The second electrode terminal 21 is connectable to a second electrode surface 2B (FIG. 12b) of the capacitor element unit U. The second connection terminal 24 is extended from the second electrode terminal 21. The second electrode terminal 21, except for the second connection terminal 24, has an overall shape in the form of a flat plate.

The first busbar B1 is relatively structurally complicated, as compared with the second busbar B1. The first busbar B1 has a first electrode terminal 11, a lateral side coupler 12, an overhang 13, and a first connection terminal 14. The first electrode terminal 11 is connectable to a first electrode surface 2A (FIG. 12b) of the capacitor element unit U. The lateral side coupler 12 is extended from the first electrode terminal 11 along a lateral surface of the capacitor element unit U. The overhang 13 is extended from the lateral side coupler 12 in a manner that vertically closely overlaps the second electrode terminal 21. The first connection terminal 14 is extended from the overhang 13. The overall shape in cross section of the first electrode terminal 11, the lateral side coupler 12 and the overhang 13, other than the first connection terminal 14, is substantially in the form of a horizontally flipped, rectangular C-like shape.

The connection terminals are used for connection to a power feed line. Except for these connection terminals, the busbars are entirely coated with a coating resin (not illustrated in the drawings).

A matter to be noted in this structure is that the overhang 13 of the first busbar B1 on the upper side of the horizontally flipped, rectangular C-like shape vertically closely overlaps the second electrode terminal 21 of the second busbar B2 on its outer side (upper side).

In the capacitor thus structured and shaped, the second busbar B2 to be mounted to the busbar B1 may be difficult to move downward after the first busbar B1 is set on the soldering jig. The second electrode terminal 21, while staying below the overhang 13, may need to be laterally inserted, as illustrated in FIGS. 12a to 12c. With the second electrode terminal 21 being inserted in this manner, the first busbar B1 and the second busbar B2 may substantially form a horizontally flipped, rectangular C-like shape. The capacitor element unit U to be mounted then to the second busbar B2 may be difficult to move immediately downward from an upper position, because the overhang 13 and the second electrode terminal 21 are disposed in a manner that vertically overlap each other and may be accordingly likely to interfere with the downward movement of the capacitor element unit U.

Faced with this structural bottleneck, the capacitor element unit U to be mounted to the soldering jig may have to be inserted laterally through an opening (inlet) 40a on the opposite side of the lateral side coupler 12 across a space 40 between the first and second electrode terminals 11 and 12.

CITATION LIST

Patent Literature

Patent literature 1: JP 2002-367857 A (FIG. 4)
Patent literature 2: JP 2014-113053 A (FIG. 19)

SUMMARY OF INVENTION

Technical Problem

Such restrictions at the time of insertion, however, may provoke the following issues.

There may be certain tolerances between vertical widths of the capacitor elements included in the capacitor element unit. Yet, the electrode terminals of the busbars need to be soldered properly to all of the capacitor elements in spite of such dimensional tolerances. To this end, the electrode terminal is partly cut out and bent upward to form tongue-shaped protruding pieces for connection integral with the electrode terminal. The tongue-shaped protruding pieces have elasticity and are displaceable. Such protruding pieces may be indispensable regardless of the direction of insertion of the capacitor element unit and are formed and used in the known art described earlier.

Below is described the operation when this elastic, protruding piece is formed on the first electrode terminal 11 of the first busbar B1 on the lower side. As illustrated in FIG. 11, the first electrode terminal 11 is partly cut out and bent upward to form, on this electrode terminal, a tongue-shaped protruding piece 11a' for connecting purpose. Prior to the formation of this protruding piece 11a', a cutout hole 11b is opened in the first electrode terminal 11. At the time, a part of the electrode terminal is left uncut to form the protruding piece. The protruding piece 11a' extends from an edge of the cutout hole 11b and linearly inclines upward and thereby becomes elastic. More specifically, the tongue-shaped protruding piece 11a' inclines obliquely upward from its base part at the hole edge toward a free end side of this piece. This protruding piece, from the base part toward the free end side, progressively approaches an electrode surface of the capacitor element (first electrode surface) 1a. Conventionally, each capacitor 1 has two or more such elastic, linearly-inclined, tongue-shaped protruding pieces 11a'.

When the capacitor element unit U (capacitor elements 1) is mounted to the soldering jig downward from an upper position as in the known art illustrated in FIGS. 9a and 9b, the linearly inclined, protruding pieces 11a' are pushed downward by the lower surface of the capacitor element 1, i.e., first electrode surface 1a, and are thereby elastically depressed. Then, the counteraction generated against the downward push powerfully pushes continuously the protruding pieces 11a' back against the first electrode surface 1a until the soldering is done. This may effectively absorb any tolerances among vertical widths of the capacitor elements 1, assuring that the linearly inclined, protruding pieces 11a' and the first electrode terminal 11 are firmly soldered to an electrode surface 1b.

When the capacitor element unit is inserted from a lateral side, as discussed in the invention disclosed herein, the capacitor element unit U (capacitor elements 1) may fail to be inserted as far as a predetermined position in the back of the space, because a lateral surface of this capacitor element in the direction of insertion (in the vicinity of a lower-end corner) may contact and block the linearly inclined, protruding pieces 11a'.

The overhang 13 is extended from the first electrode terminal 11 through the lateral side coupler 12 as far as an upper outer position of the second electrode terminal 21 and vertically overlaps the second electrode terminal 21. When the components are mounted to the soldering jig in the capacitor including the first and second busbars B1 and B2 arranged in the form of a horizontally flipped, rectangular C-like shape, however, the linearly inclined, protruding piece(s) 11a' for connecting purpose serving to absorb any tolerances among vertical widths of the capacitor elements 1 may accidentally contact and block the capacitor element unit U (capacitor elements 1) inserted from a lateral side. Such contact may be likely to occur depending on in which direction this piece is protruding (in which direction this piece is vertically bent), possibly inviting the risk of poor assembling workability. Possible contact by the protruding piece(s) 11a' may be avoidable if the direction of protrusion of this piece coincides with the direction of insertion of the capacitor element unit U. This, however, may draw the base parts of the protruding pieces 11a' away from the lateral side coupler 12 and may raise another issue; degradation of the ESL (equivalent series inductance) and the ESR (equivalent series resistance).

This invention was accomplished to address these issues of the known art and is directed to providing solutions that can offer better assembling workability in capacitors that are so shaped and structured that the first and second busbars are arranged in the form of a horizontally flipped, rectangular C-like shape.

Technical Solutions

To this end, this invention provides the following technical features.

This invention provides a capacitor, including:
a capacitor element unit having electrode surfaces of different polarities on both end sides thereof,
a first busbar and a second busbar respectively connected to the electrode surfaces; and
a coating resin that covers all of the capacitor element unit and that partly covers the first and second busbars,
the second busbar including:
a second electrode terminal connected to one of the electrode surfaces; and
a second connection terminal extended from the second electrode terminal,
the first busbar including:
a first electrode terminal connected to one of the electrode surfaces;
a lateral side coupler extended from the first electrode terminal along a lateral surface of the capacitor element unit;
an overhang extended from the lateral side coupler in a manner that closely overlaps the second electrode terminal; and
a first connection terminal extended from the overhang,
at least one of the first electrode terminal and the second electrode terminal having a connecting protrusion, the connecting protrusion being elastically depressible in response to contact with the electrode surface of the capacitor element unit inserted from an opposite side of the lateral side coupler across a space between the first electrode terminal and the second electrode terminal.

This invention further provides a manufacturing method for the capacitor structured as described above, including:
a first step of setting the first busbar on a soldering jig;
a second step of inserting the second busbar from a lateral side, with the second electrode terminal being positioned to follow a lower surface of the overhang of the first busbar; and
a third step of inserting the capacitor element unit from a lateral side into a space between the first electrode terminal and the second electrode terminal,
the third step further including:
inviting at least one of the electrode surfaces to make sliding contact with the connecting protrusion to elastically depress the connecting protrusion during the insertion of the capacitor element unit; and
pushing the connecting protrusion against the at least one of the electrode surfaces using an elastic restoring force of the protrusion.

The capacitor element unit may typically include a plurality of capacitor elements, however, is not necessarily thus structured. Instead, the capacitor element unit may be provided with one capacitor element alone.

In the capacitor disclosed herein, the first and second busbars are arranged in the form of a horizontally flipped, rectangular C-like shape. To assemble these busbars with the capacitor element unit, the capacitor element unit may be inserted laterally through an inlet formed on the opposite side of the lateral side coupler across a space between the first and second electrode terminals. At least one of the electrode terminals has a connecting protrusion(s) formed to absorb any tolerances among vertical widths of the respective capacitor elements during the insertion.

In this invention, the connecting protrusion may be elastically depressible in response to sliding contact with the electrode surface of the inserted capacitor element unit. Thus, it may be unlikely that the capacitor element unit fails to reach a predetermined position in the back of the space when its lateral surface ahead in the direction of insertion is butted against and blocked by the connecting protrusion.

The capacitor element unit, because its electrode surface contacts and elastically depresses the connecting protrusion, may be successfully pushed into the back of the space to arrive at a predetermined position.

A plurality of connecting protrusions may have certain tolerances in size and shape. Yet, an elastic restoring force of the connecting protrusions may serve to equalize pressing forces applied at different points of contact between the electrode surface and the electrode terminal. Thus, the electrode terminals of the busbars may be firmly soldered to all of the capacitor elements (improved soldering performance).

The capacitor and its manufacturing method according to this invention may include the following preferred aspects, examples and modified examples.

1] According to an aspect, the first and/or second electrode terminal is partly cut out into a hole and bent upward to form, as the connecting protrusion, a protruding piece for connection having a tongue-like shape and integral with the first and/or second electrode terminal. The protruding piece is bent in a vertically reversed, checkmark-like shape. The protruding piece, from one end on a base side toward an apex of the vertically reversed, checkmark-like shape, progressively approaches the electrode surface. The protruding piece, from the apex of the vertically reversed, checkmark-like shape toward another end, draws away from the electrode surface. The protruding piece contacts the electrode surface at the apex of the vertically reversed, checkmark-like shape.

To form the tongue-shaped protruding piece, the first and/or second electrode terminal is partly cut out and bent upward and then further bent in the vertically reversed, checkmark-like shape. This protruding piece is elastically deformable from one end on the base side continuous to the electrode terminal to the apex of the vertically reversed, checkmark-like shape. Then, this protruding piece, from the apex of the vertically reversed, checkmark-like shape to the other end, receives an inserted edge of the capacitor element unit and guides the edge along the inclined surface of the checkmark-like shape. As a result of these sliding movement, contact and guiding action, the protruding piece may be smoothly deformed and depressed. This may reduce any obstacle and/or resistance against the insertion of the capacitor element unit, allowing this element unit to be inserted under better conditions.

Describing the vertically reversed, checkmark-like shape in detail; the apex of the protruding piece for connection is made by any part but end parts of this piece, the apex of the protruding piece contacts the electrode surface, and one end of this piece opposite to its base part continuous to the electrode terminal (the other end) is lower than the apex. It may be either a straight line or a curved line that connects the apex with one end and/or that connects the apex with the other end. To facilitate the insertion of the capacitor element unit into between the busbars, one end of the protruding piece at its base part continuous to the electrode terminal (the other end) may be flush with or may be lower than the plane of the electrode terminal.

2] According to an aspect, the protruding piece for connection integral with the electrode terminal is formed by being extended from an edge of a cutout hole formed in the first and/or second electrode terminal.

This may be structurally advantageous for the protruding piece to be formed in an extensive region of the electrode terminal other than its peripheral edge (region with a relatively large area on the inner side of the peripheral edge). Thus, the protruding piece for connection may be formed without compromising the strength of the electrode terminal.

3] According to an aspect, the first busbar is connected to the electrode surface on a lower end side of the capacitor element unit, and the protruding piece for connection is formed on the first electrode terminal on a side where the lateral side coupler is disposed. According to an aspect, the protruding piece for connection is extended from the edge of the cutout hole of the first electrode terminal at or near a position most proximate to the lateral side coupler on a whole circumference in a direction away from the lateral side coupler.

The protruding piece for connection is not formed on the second electrode terminal on the upper side but is formed on the first electrode terminal on the lower side. This protruding piece thus formed on the second electrode terminal may be more readily elastically deformable under the gravity from the capacitor element unit.

4] According to an aspect, the lateral side coupler and the overhang are interposed between the first connecting terminal and the first electrode terminal with the protruding piece being formed thereon. The first electrode terminal, therefore, has a substantially longer current path than that of the second electrode terminal.

The protruding piece for connection may preferably be extended from the edge of the cutout hole of the first electrode terminal at or near a position most proximate to the lateral side coupler on a whole circumference in a direction away from the lateral side coupler. This may reduce the current path length to the minimum, consequently lowering the ESL (equivalent series inductance) and the ESR (equivalent series resistance) of the first busbar.

In addition to that, the protruding piece for connection being extended from the edge of the cutout hole of the first electrode terminal away from the lateral side coupler means that the longitudinal direction of the protruding piece being parallel to the direction of insertion of the capacitor element unit. This may decrease the frictional resistance of the capacitor element unit generated at the time of insertion.

5] According to an aspect, the first and/or second electrode terminal has a plurality of the protruding pieces for connection integrally formed, and all of the plurality of protruding pieces for connection are extended from the edges of the cutout holes in parallel to each other in a direction away from the lateral side coupler. Thus, any tolerances between the vertical widths of the capacitor elements may be absorbed to the fullest extent.

6] According to an aspect, an insulating member in the form of a sheet is interposed between the overhang of the first busbar and the second electrode terminal of the second busbar that vertically closely overlaps the overhang.

Advantageous Effects of the Invention

Because of the horizontally flipped, rectangular C-like shape of the first and second busbars, the capacitor element unit may have to be inserted laterally from the opposite side of the lateral side coupler into a space between the first and second electrode terminals. At that time, the protruding piece(s) for connection required to absorb any tolerances between the vertical widths of the capacitor elements may interfere with or block the insertion of the capacitor element unit. According to this invention, however, the protruding piece(s) is elastically depressible upon sliding contact with the electrode surface of the capacitor element unit. Such interference or blocking, therefore, may be unlikely to occur, and the capacitor element may be properly and smoothly inserted. As a result, the assembling workability may be improved, and the soldering jig may be used without any major alteration.

DESCRIPTION OF EMBODIMENTS

The capacitor disclosed herein is more specifically described below based on specific examples of this invention.

In FIGS. 1 to 7 and 8a to 8c are illustrated a capacitor element 1, a capacitor element unit U, a first electrode surface 2A on a lower end side of the capacitor element unit U, a second electrode surface 2B on an upper end side of the capacitor element unit U, a first busbar B1, a second busbar B2, and an exterior resin (coating resin). The capacitor element 1 may be, for example, a film capacitor in which a dielectric film and a metallic film (electrode) are alternately stacked in layers or a film capacitor wound around with layers of a dielectric film having at least one metallized surface.

Figure 2:
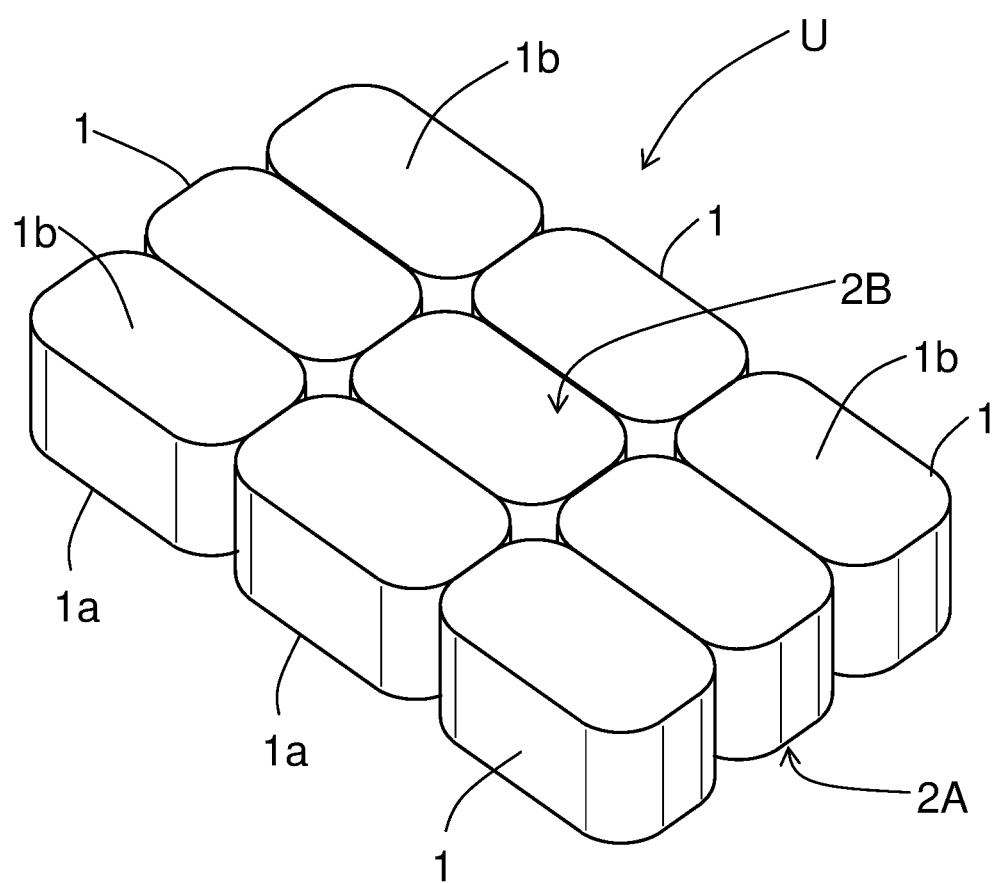
FIG. 2 is a perspective view of a capacitor element unit in the capacitor according to the example of this invention.
Figure 7:
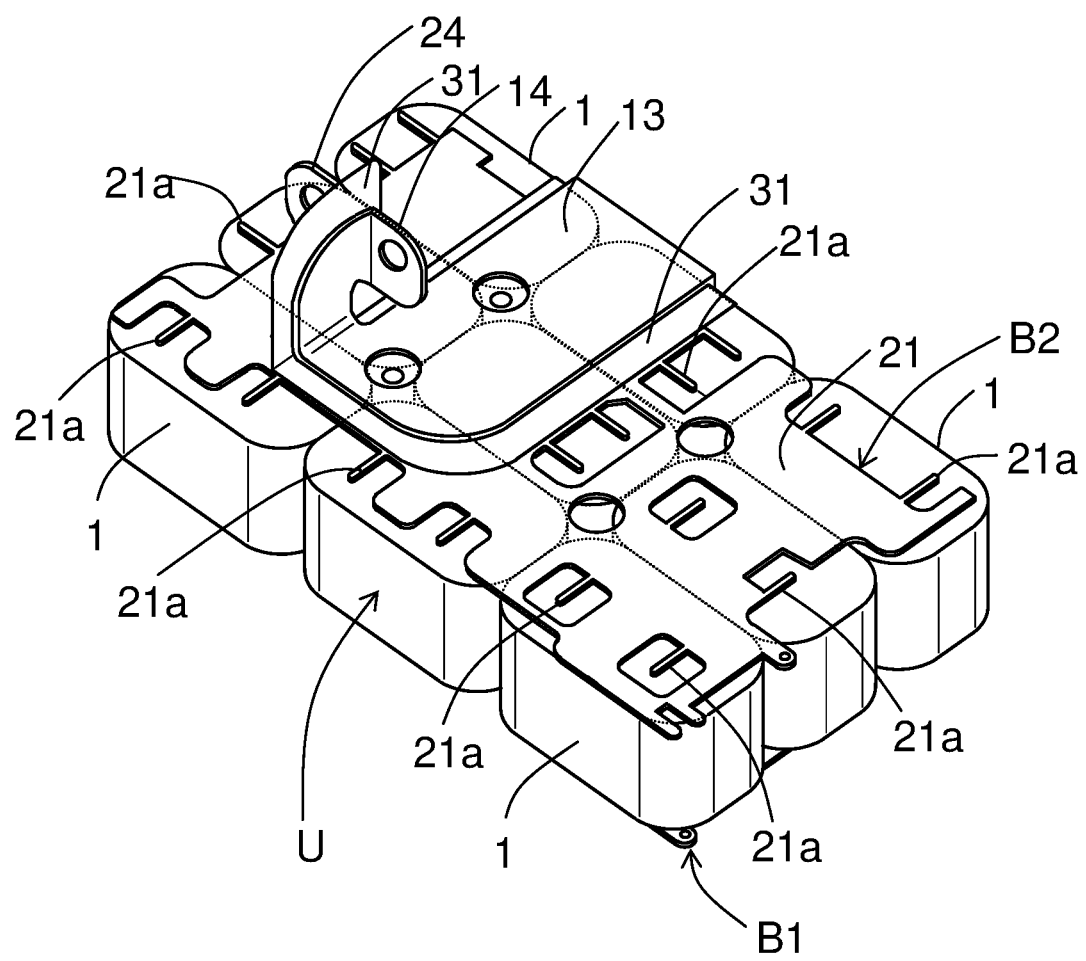
FIG. 7 is a perspective view that illustrate assembling steps (first and second busbars) in the capacitor according to the example of this invention.

As illustrated in FIGS. 2 and 7, the capacitor element unit U includes the capacitor elements 1 that are arranged in a matrix shape with three rows and three columns. The matrix of three rows and three columns is just an example. The matrix may optionally consist of "m" number of columns and "n number of rows where the "m" and the "n" are each an integer greater than 1 (m=1, 2, . . . , n=1, 2, . . . ). The "m"×"n" number of capacitor elements 1 are orderly and closely arranged in axially parallel to one another and have a rectangular or square shape on the whole in plan view.

Figure 1:
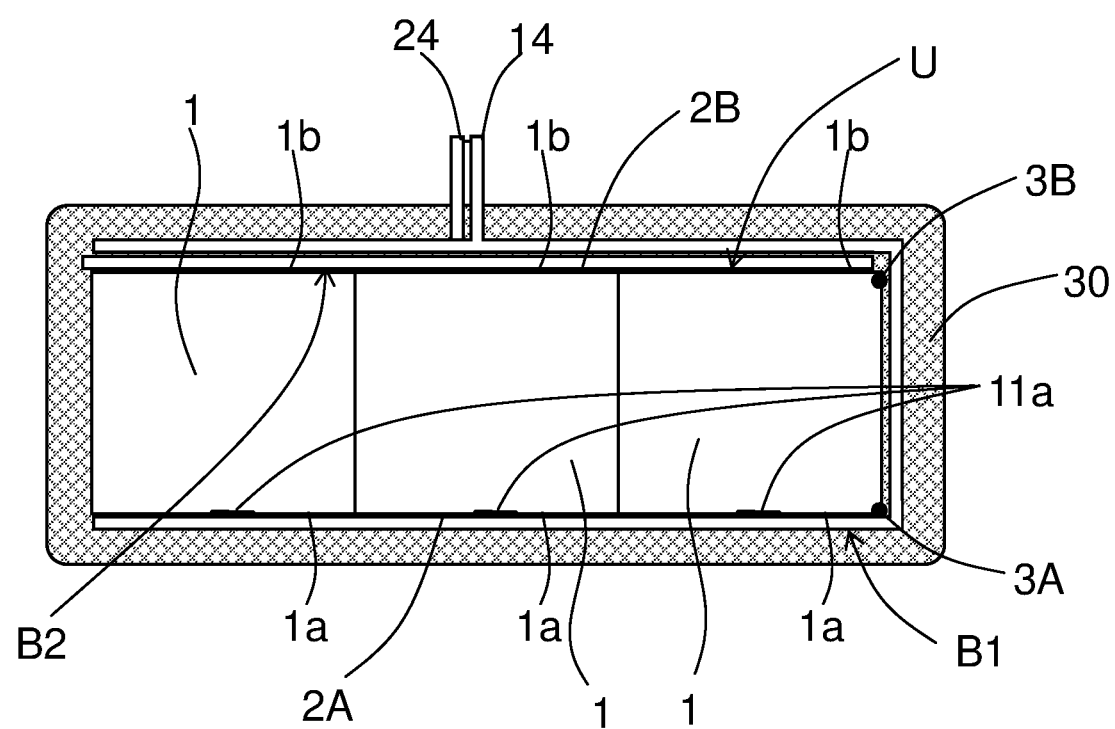
FIG. 1 is a cross-sectional view of a capacitor according to an example of this invention.

As illustrated in FIG. 1, the capacitor elements 1 each have a first electrode surface 1a on an axially lower end side and further have a second electrode surface 1b on an axially upper end side. The first electrode surface 1a and the second electrode surface 1b naturally have polarities that differ from each other. In the capacitor element U having nine capacitor elements 1 arranged in three rows and three columns, the nine first electrode surfaces 1a may be collectively referred to as first electrode surface 2A, while the nine second electrode surfaces 1b may be collectively referred to as second electrode surface 2B.

Figure 3:
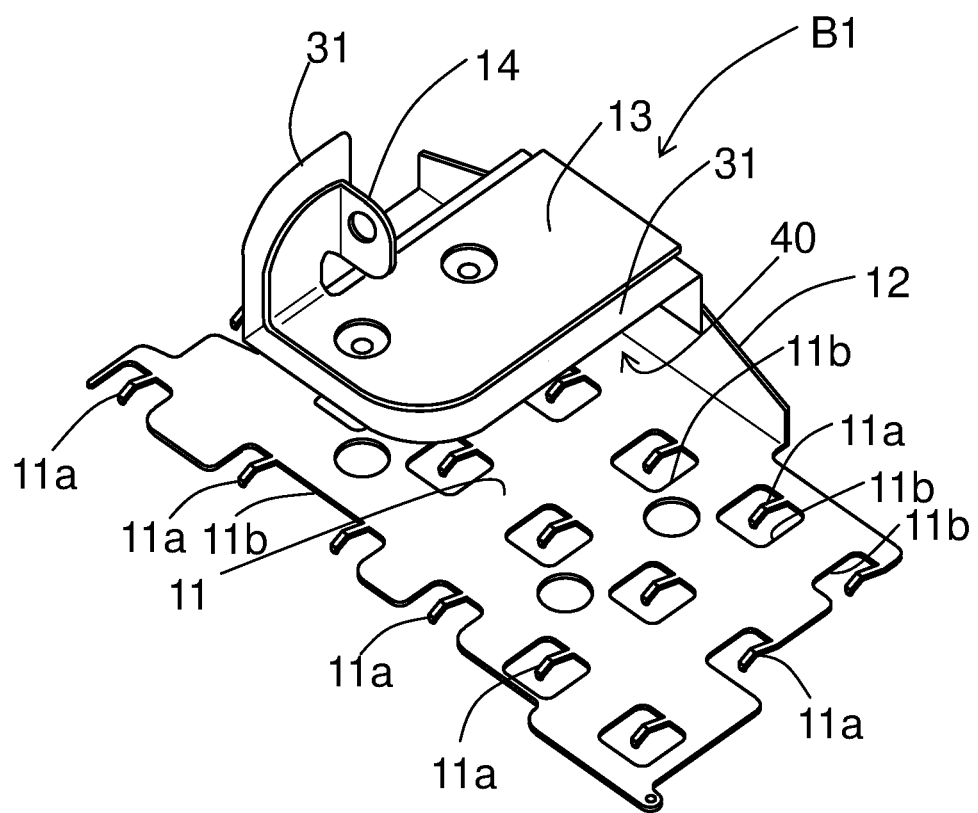
FIG. 3 is a perspective view of a first busbar in the capacitor according to the example of this invention.

As illustrated in FIG. 3, the first busbar B1 has a first electrode terminal 11, a lateral side coupler 12, an overhang 13, and a first connection terminal 14. The first electrode terminal 11 is connectable to the first electrode surface 2A on the lower end side of the capacitor element unit U. The lateral side coupler 12 is extended from the first electrode terminal 11 along a lateral surface of the capacitor element unit U. The overhang 13 is extended from the lateral side coupler 12 in a manner that vertically closely overlaps the second electrode terminal 21 of the second busbar B2. The first connection terminal 14 is extended from the overhang 13.

Figure 5:
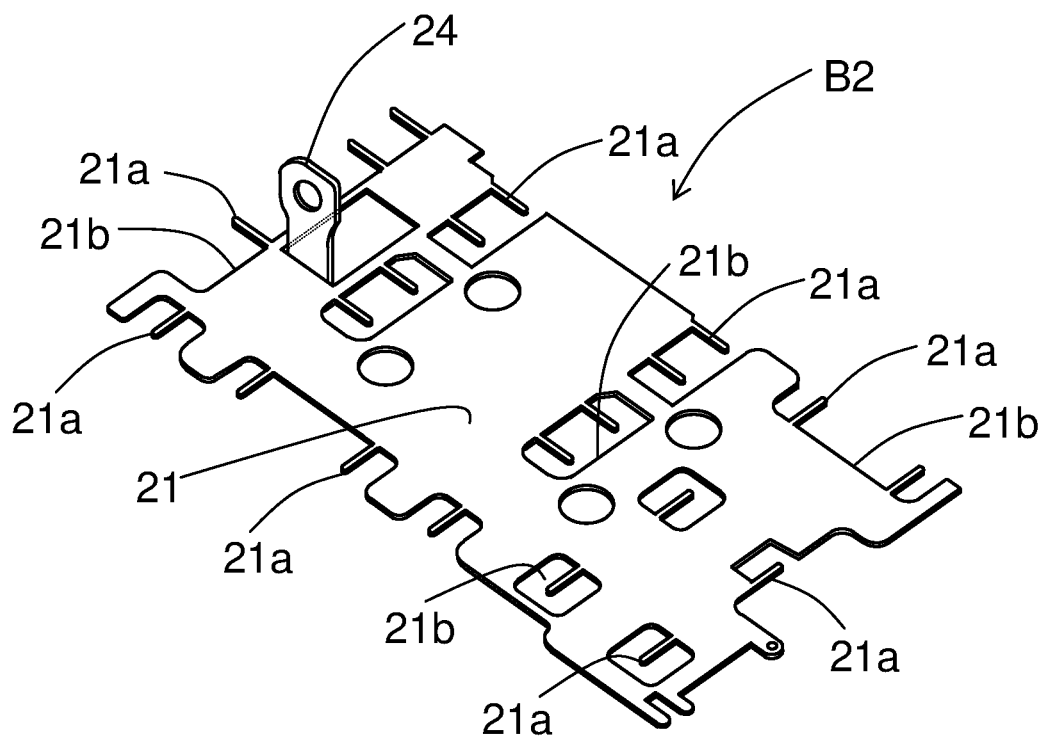
FIG. 5 is a perspective view of a second busbar in the capacitor according to the example of this invention.

As illustrated in FIG. 5, the second busbar B2 has a second electrode terminal 21 and a second connection terminal 24. The second electrode terminal 21 is connectable to the second electrode surface 2B on the upper end side of the capacitor element unit U. The second connection terminal 24 is extended upward from the second electrode terminal 21.

There are certain tolerances among the vertical widths (axial lengths) of the nine capacitor elements 1 in the capacitor element unit U. A protruding piece 11a for connecting purpose; an example of the connecting protrusion, may serve to absorb such tolerances, which is described below.

Figure 4:
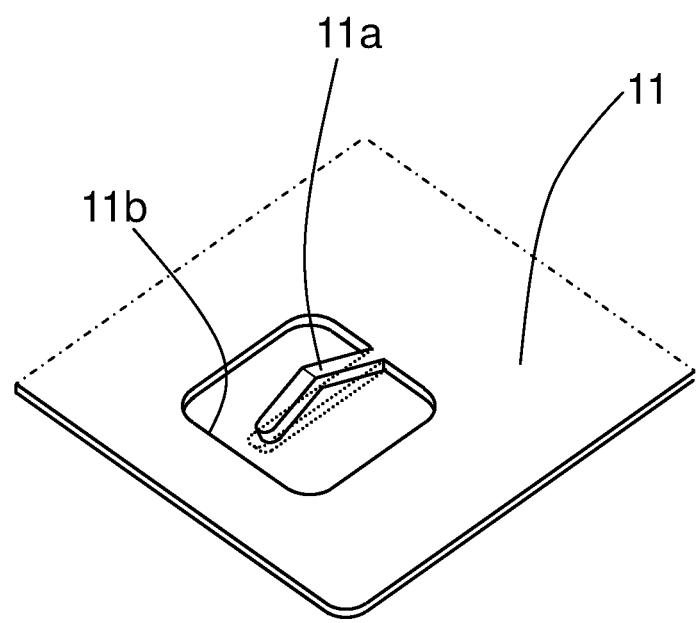
FIG. 4 is a perspective view of a cutout hole and a protruding piece for connection in the capacitor according to the example of this invention; an example of the connecting protrusion disclosed herein.

As illustrated in FIG. 4, the first electrode terminal 11 of the first busbar B1 is partly cut out in a tongue-like shape and bent upward to form the protruding piece 11a for connecting purpose. The protruding pieces 11a are thus formed integral with this electrode terminal. Specifically, the protruding pieces 11a are each extended from an edge of a cutout hole 11b when these holes are formed in the first electrode terminal 11. As is clear from FIGS. 2 and 3 compared with each other, of the protruding pieces 11a for connecting purpose, two protruding pieces are formed for each of the capacitor elements 1 arranged in the 3×3 matrix shape and are spaced at equal intervals. Likewise, of the cutout holes 11b used to form the protruding pieces 11a, two cutout holes are formed for each of the capacitor elements 1 arranged in the 3×3 matrix shape. In any other portions but the peripheral edge of the first electrode terminal 11, the cutout holes 11b are each shaped with a closed curve. On the other hand, some of the cutout holes 11b at the peripheral edge of the first electrode terminal 11 are each shaped with an open curve and are thus open and continuous to the outer space.

As illustrated in FIG. 3, the protruding pieces 11a for connecting purpose; two for a respective one of the capacitor elements 1, are each extended from the edge of the cutout hole 11b in the first electrode terminal 11 at or near a position most proximate to the lateral side coupler 12 on the whole circumference of the cutout hole. The direction of extension of the protruding piece 11a for connecting purpose coincides with a direction away from the lateral side coupler 12 (opposite to the direction of insertion of the capacitor element unit U), i.e., all of the protruding pieces 11a for connecting purpose are parallel to one another in plan view.

As illustrated in FIG. 4, the protruding pieces 11a for connecting purpose are bent in a vertically reversed, checkmark-like shape. The protruding piece 11a inclines obliquely upward from its base part at the edge of the cutout hole 11b toward an apex of the vertically reversed, checkmark-like shape, approaching the first electrode surface 2A of the capacitor element unit U. The protruding piece 11a then inclines obliquely downward toward its free end side from the apex of the vertically reversed, checkmark-like shape, drawing away from the first electrode surface 2A. The protruding piece 11a contacts the first electrode surface 2A at the apex of the vertically reversed, checkmark-like shape. The free end of the protruding piece 11a is substantially flush in height with the cutout hole 11b.

As illustrated in FIG. 5, the second busbar B2 has a second electrode terminal 21 in the form of a flat plate and a second connection terminal 24 standing upward from the second electrode terminal 21. The second electrode terminal 21 also has protruding pieces for connection; protruding pieces 21a having a tongue-like shape and formed integral with the second electrode terminal 21. Specifically, the protruding pieces 21a are each extended from an edge of a cutout hole 21b when these holes are formed in the second electrode terminal 21. Of the protruding pieces 21a for connecting purpose, two protruding pieces 21a are formed for each of the capacitor elements 1 arranged in the 3×3 matrix shape and are spaced at equal intervals. The cutout holes 21b are also formed likewise. In any other portions but the peripheral edge of the second electrode terminal 21, the cutout holes 21b are each shaped with a closed curve. On the other hand, some of the cutout holes 21b at the peripheral edge of the second electrode terminal 21 are each shaped with an open curve and are thus open and continuous to the outer space.

In some of the protruding pieces 21a for connecting purpose of the second busbar B2, their tongue-shaped tips may not be uniformly directed, unlike the protruding pieces 11a of the first busbar B1. Some of the protruding pieces 21a are extended likewise in the same direction as the direction of insertion. The other protruding pieces 21a, on the other hand, may be extended in the opposite direction of insertion or extended in a direction perpendicular to the direction of insertion and then further extended rightward or leftward. These protruding pieces being thus differently directed may certainly improve a soldering strength between the capacity element unit U and the second electrode terminal 21.

The protruding pieces 21a for connecting purpose of the second electrode terminal 21 are not formed in such a vertically reversed checkmark as the protruding piece 11a of the first electrode terminal 11 but are formed flush with the plane of the second electrode terminal 21. In order to adhere the first and second electrode terminals 11 and 21 under pressure to the first and second electrode surfaces 2A and 2B of the capacitor element unit U, the first electrode terminal 11 alone may be required to have the protruding pieces shaped like a reversed checkmark.

Figure 6:
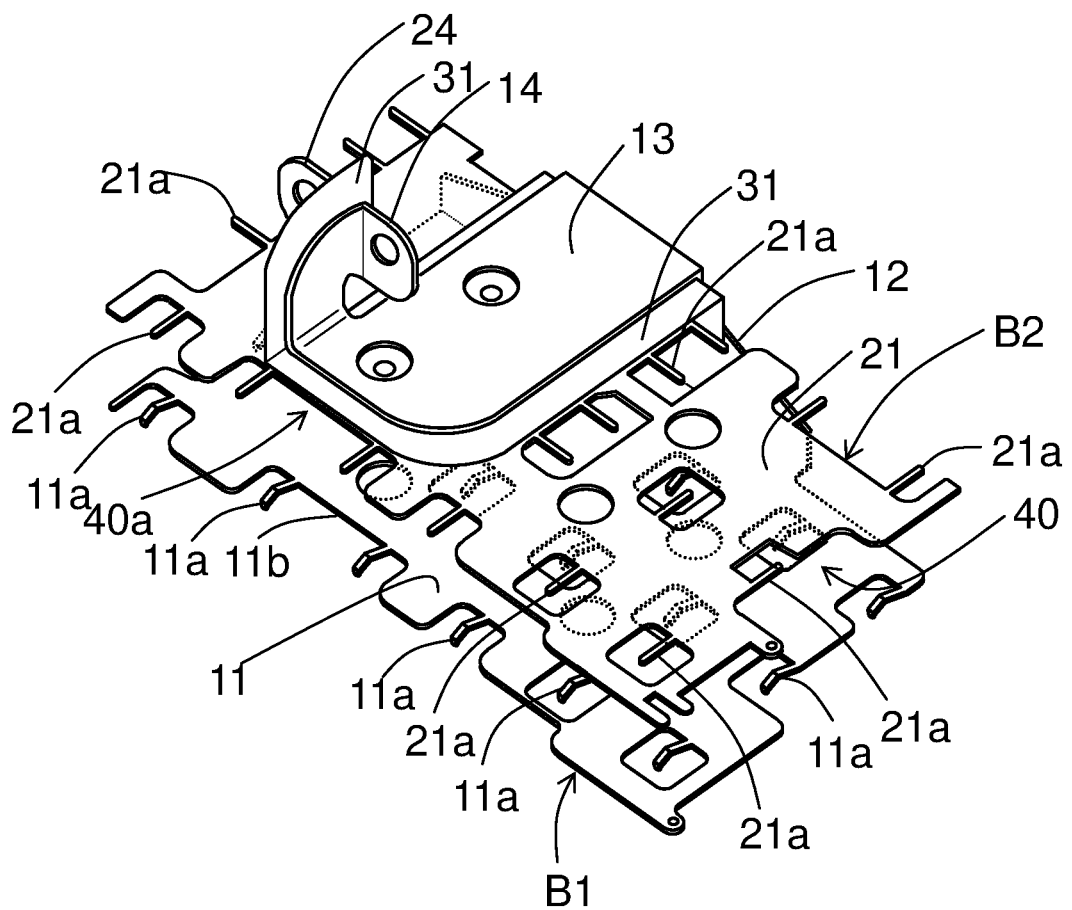
FIG. 6 is a perspective view that illustrates assembling steps (first and second busbars) in the capacitor according to the example of this invention.

Referring to FIG. 6 and FIGS. 3 and 5 viewed for comparison, the first electrode terminal 11 of the first busbar B1 and the second electrode terminal 21 of the second busbar B2 are substantially equal in size. The overhang 13 of the first busbar B1 is significantly smaller than the first electrode terminal 11 and the second electrode terminal.

As illustrated in FIGS. 1, 6 and 7, the overhang 13 of the first busbar B1 is formed in a manner that vertically closely overlaps the second electrode terminal 21 of the second busbar B2 and that extends in parallel to this electrode terminal. An insulating member 31 in the form of a sheet is further provided that has a horizontal portion and a vertical portion. The horizontal portion is interposed between the overhang 13 and the second electrode terminal 21 that vertically closely overlaps the overhang. The vertical portion is fitted in a vertically small space between the first connection terminal 14 and the second connection terminal 24 facing each other in proximity.

FIG. 1 includes structural features not illustrated in FIGS. 6 and 7. In this drawing, the first connection terminal 14 and the second connection terminal 24 are disposed at positions near the center of the capacitor, which differ from the examples illustrated in FIGS. 6 and 7 in which these terminals have been displaced. FIG. 1 illustrates the structurally simplified first and second connection terminals 14 and 24, as compared with FIGS. 6 and 7. These minor changes are solely intended to help the readers to easily understand the conceptual elements of this invention and should not be construed as having any significant impact on the true nature of this invention.

Next is described how to mount the first busbar B1, second busbar B2 and capacitor element unit U to a soldering jig (not illustrated in the drawings).

1] First, the sheet-like insulating member 31 is bonded to the lower surface of the overhang 13 and to the outer surface of the first connection terminal 14 of the first busbar B1 (see FIG. 3). Then, the first busbar B1 with the sheet-like insulating member 31 is set on the soldering tool (first step).

2] In the first busbar B1 illustrated in FIG. 3, the second busbar B2 illustrated in FIG. 5 is laterally moved and inserted into a space 40 through its opening 40a on one side. The space 40 is formed by the lower-end first electrode terminal 11 horizontally disposed, the lateral side coupler 12 vertically disposed, and the insulating member 31 bonded to the upper-end overhang (second step). FIG. 6 illustrates the result of this step. The second busbar B2 is inserted into this space, with the second electrode terminal 21 being disposed along the lower surface of the overhang 13. As a result, the second electrode terminal 21 is moved toward and located near the lower surface of the overhang 13, and the horizontal portion of the sheet-like insulating member 31 is interposed between this electrode terminal and overhang. Further, the second connection terminal 24 is moved toward and located near the first connection terminal 14, and the vertical portion of the sheet-like insulating member 31 is interposed between these connection terminals.

Next, the capacitor element unit U is laterally moved and inserted into the space 40 through its opening 40a on one side (third step). FIG. 7 illustrates the result of this step.

Figure 8A:
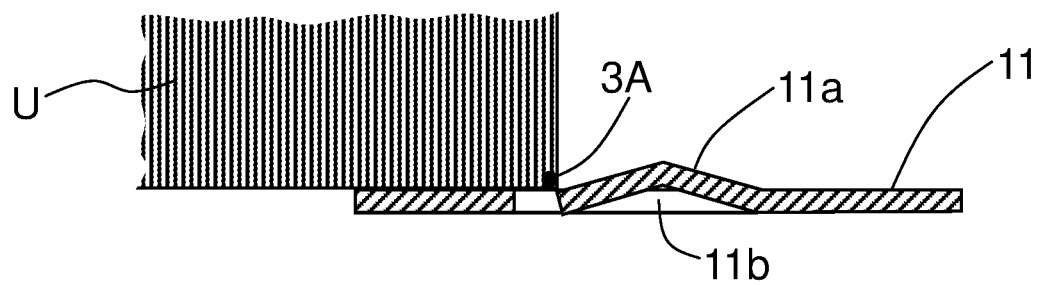
FIG. 8a is a drawing of an assembling step in the capacitor according to the example of this invention, illustrating how a protruding piece for connection acts in response to the insertion of a capacitor element unit.
Figure 8B:
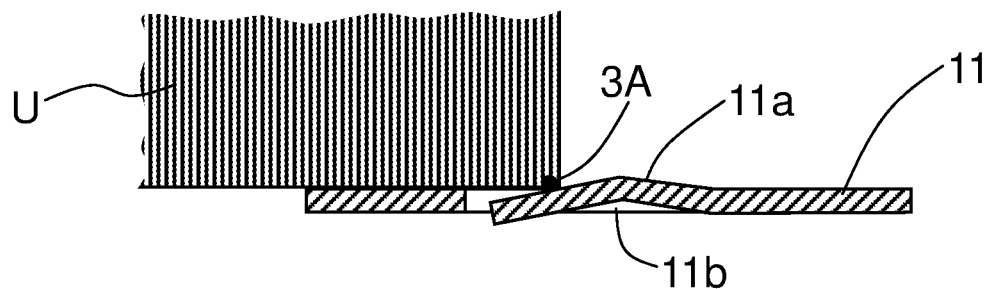
FIG. 8b is a drawing of an assembling step in the capacitor according to the example of this invention, illustrating how the protruding piece for connection acts in response to the insertion of the capacitor element unit.
Figure 8C:
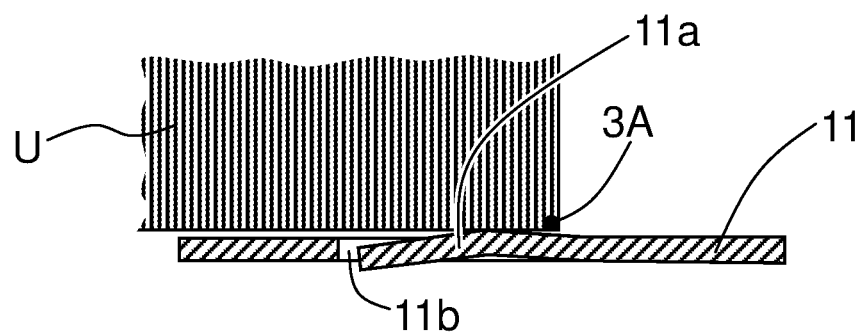
FIG. 8c is a drawing of an assembling step in the capacitor according to the example of this invention, illustrating how the protruding piece for connection acts in response to the insertion of the capacitor element unit.
Figure 9A:
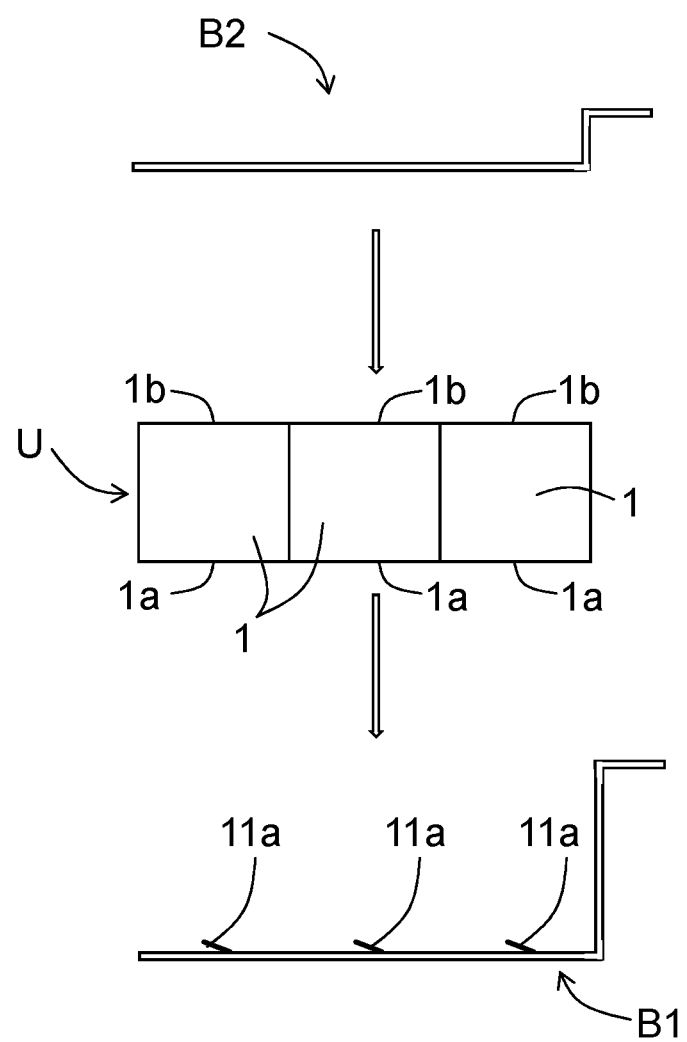
FIG. 9a illustrates a working step of the known art (1).
Figure 9B:
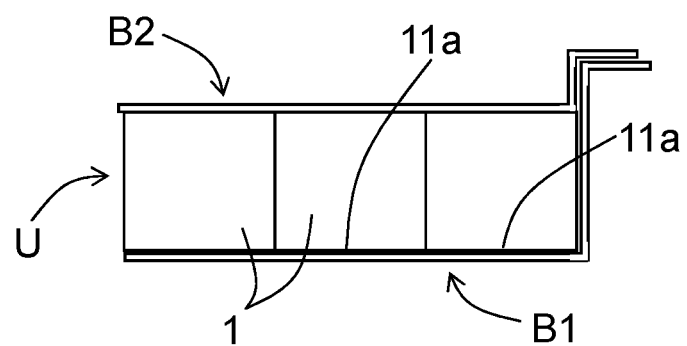
FIG. 9b illustrates a working step of the known art (1).
Figure 10A:
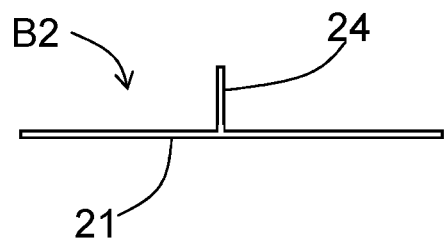
FIG. 10a illustrates a working step of the known art (2).
Figure 10B:
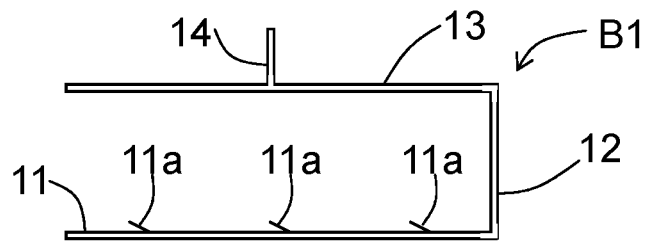
FIG. 10b illustrates a working step of the known art (2).
Figure 10C:
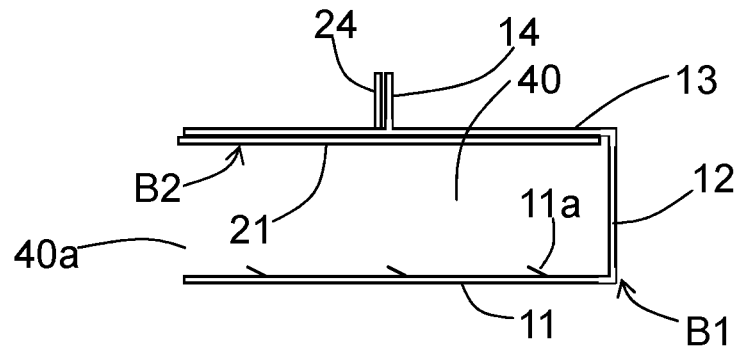
FIG. 10c illustrates a working step of the known art (2).
Figure 10D:
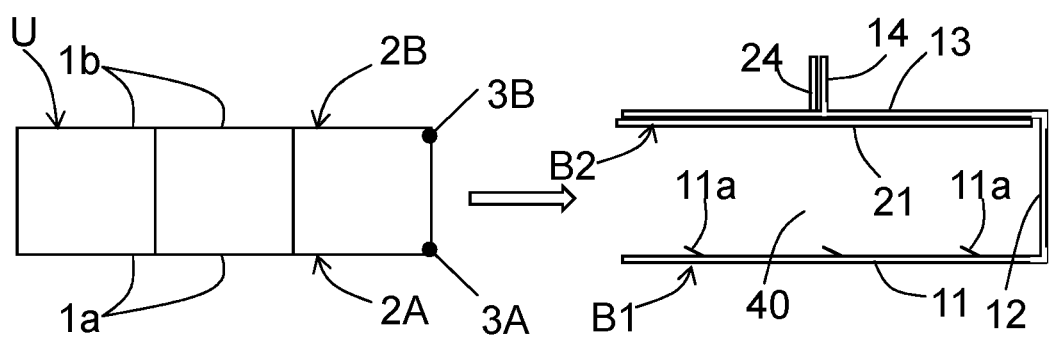
FIG. 10d illustrates a working step of the known art (2).
Figure 11:
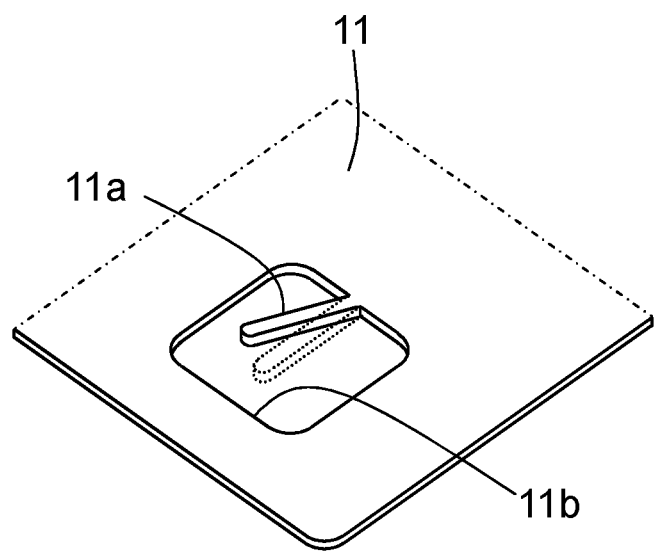
FIG. 11 is a perspective view of a cutout hole and a protruding piece for connection of the known art.
Figure 12A:
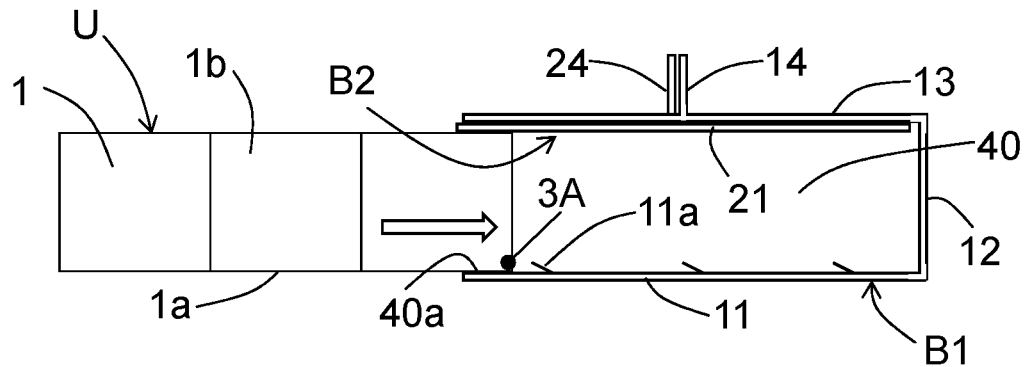
FIG. 12a illustrates a working step of the known art (3).
Figure 12B:
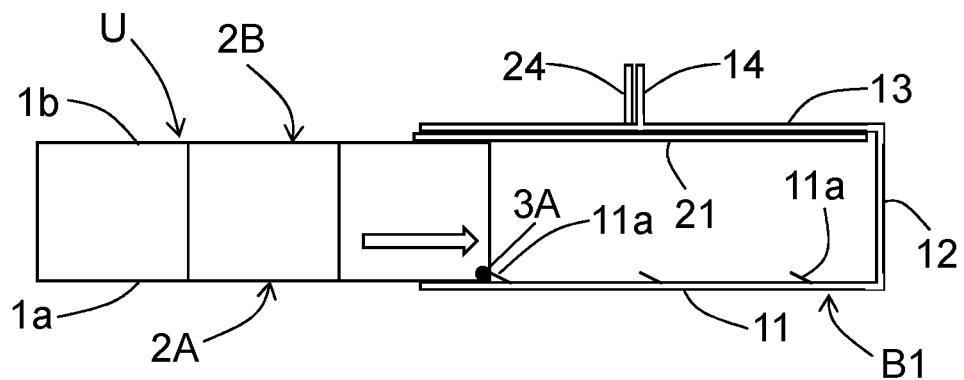
FIG. 12b illustrates a working step of the known art (3).
Figure 12C:
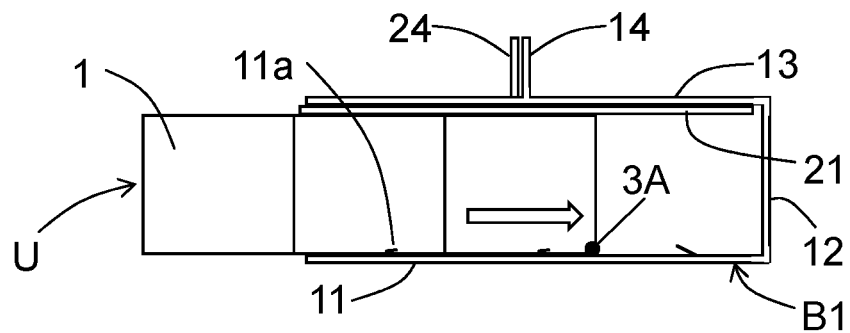
FIG. 12c illustrates a working step of the known art (3).
Figure 13:
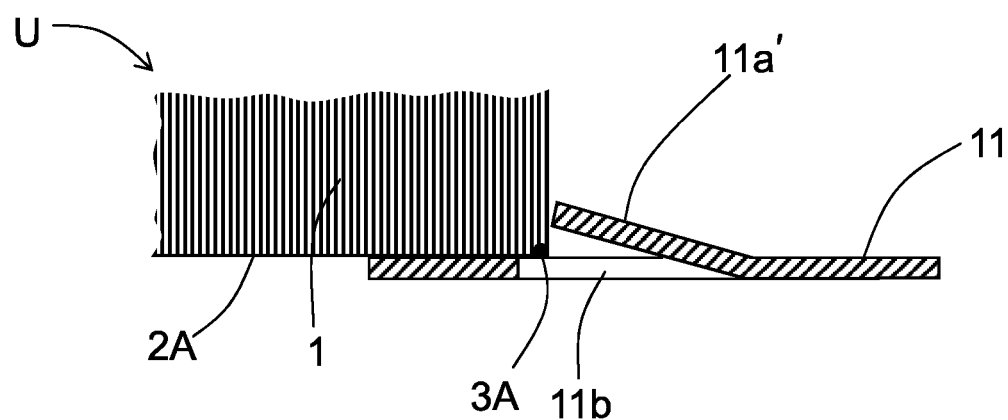
FIG. 13 is a cross-sectional view that illustrates a problem with the known art.

As illustrated in FIGS. 8a to 8c, the capacitor element unit U, after being inserted in the space 40 through the opening 40a, moves into the back of the space 40 (right side on FIGS. 8a to 8c) while its upper-end corner 3B and lower-end corner 3A on the lateral surface ahead in the direction of movement (see FIG. 1) are making sliding contact with, respectively, the lower surface of the second electrode terminal 21 of the second busbar B2 and the upper surface of the first electrode terminal 11 of the first busbar B1.

In the known art, the elastic and straight, tongue-shaped protruding piece 11a' for connecting purpose formed integral with the first electrode terminal 11 of the first busbar B1 may be likely to act against the insertion of the capacitor element unit U. When the lower-end corner 3A of the capacitor element unit U contacts the protruding piece 11a' for connecting purpose, the protruding piece 11a' may block any further movement of the capacitor element unit into the space 40. In case the capacitor element unit is then forced further into the space, the protruding piece 11a' may break, degrading the product quality of the capacitor.

In the example of this invention, the tongue-shaped protruding piece 11a for connecting purpose has elasticity and is formed in a vertically reversed checkmark-like shape. The free end side of the protruding piece 11a is substantially flush in height with or lower than the first electrode terminal 11. Thus, the lower-end corner 3A of the capacitor element unit U may be guided from the free end side of the protruding piece 11a onto the inclined upper surface of the protruding piece 11a. During this guiding movement, the protruding piece 11a may be elastically depressed.

As the capacitor element unit U that passed the apex of the checkmark-like shape moves further into the back of the space, the protruding piece 11a for connecting purpose is pushed downward and thereby almost flattened by the lower surface of the capacitor element unit U. The elastic restoring force of the protruding piece 11a may be accordingly increased to be strong enough to elastically press, from below, the first electrode surface 2A of the capacitor element unit U in the upper direction. As a result, the second electrode surface 2B of the capacitor element unit U may be elastically pushed against the lower surface of the second electrode terminal 21 of the second busbar B2.

In the capacitor element unit U, the capacitor elements are each pushed by two elastic, tongue-shaped protruding pieces 11a for connecting purpose. Thus, the whole capacitor element unit U is pressed by 18 protruding pieces 11a for connecting purpose that are spaced at equal intervals (in one example). The capacitor element unit U may be inserted in a stable posture into the space 40 formed by the first and second busbars B1 and B2.

The second electrode surface 2B on the upper end side of the capacitor element unit U contacts the whole second electrode terminal 21 of the second busbar B2 under a substantially equal pressing force and may be accordingly soldered well to the second electrode terminal 21 at positions of the protruding pieces 21a formed at the cutout holes 21b of the second electrode terminal B2. Further, the first electrode surfaces 1a of the capacitor elements 1 in the capacitor element unit U are pressed by the reversed checkmark-like, tongue-shaped the protruding pieces 11a. This pressing action may favorably absorb tolerances, if any, among the vertical widths (axial lengths) of the capacitor elements 1. Thus, the first electrode surfaces 1a of all of the capacitor elements 1 may be powerfully pressed by the protruding pieces 11a, and the first electrode surface 21A may be accordingly soldered well to the first electrode terminal 11.

The protruding pieces 21a for connecting purpose formed on the second electrode terminal 21 of the second busbar B2 may not be uniformly directed, unlike the protruding pieces 11a for connecting purpose formed on the first electrode terminal 11 of the first busbar B. The directions of the protruding pieces 21a are thus variable, because current paths from these protruding pieces to the second connection terminal 24 may differ from one another and are redesigned to reduce to the minimum.

On the contrary, the protruding pieces 11a for connecting purpose of the first busbar B1 are all disposed in parallel to one another, and the base part of each protruding piece 11a is located at or near a position most proximate to the lateral side coupler 12 on the whole circumference of the cutout hole 11b, because electric current from the protruding pieces 11 for connecting purpose is once directed toward the lateral side coupler 12 on the first electrode terminal 11 and is then directed to flow toward the first connection terminal 14 through the lateral side coupler 12 and the overhang 13. Thus, the current path length from a respective one of the protruding pieces 11a to the first connection terminal 14 may be reduced to the minimum. As a result, the ESL (equivalent series inductance) and the ESR (equivalent series resistance) of the first busbar may be favorably lowered.

In the example described above, the first electrode terminal 11 is provided with the reverse checkmark-like, protruding pieces 11a for connecting purpose, which is an example of the connecting protrusion disclosed herein. Instead, these reverse checkmark-like protruding pieces may be formed on the second electrode terminal 21 of the second busbar B2, or may otherwise be formed on both of the upper and lower busbars B1 and B2 after their degrees of protrusion are adjusted. The reverse checkmark-like, protruding pieces for connection may be at least formed on either one of the first electrode terminal 11 of the first busbar B1 or the second electrode terminal 21 of the second busbar B2.

In the example was described the caseless capacitor coated with the exterior resin (coating resin) 30 on its outermost side. Instead, a case-molded capacitor may be employed in which a case containing the whole capacitor is injected with a coating resin.

In the first busbar and/or the second busbar, the connection terminal and the electrode terminal may be separate components and coupled to each other with rivets or by welding.

In the example described above, the reverse checkmark-like, tongue-shaped protruding piece for connection was presented as a suitable example of the elastically depressible "connecting protrusion". The connecting protrusion disclosed herein is not necessarily limited to such a protruding piece but is selectable from any other suitable examples variously modified within the scope of this invention.

For example, the protruding piece for connection is not necessarily formed in such a cantilever-like form as described herein (protruding piece having a free end on one side) but may be formed with closed ends on both sides (both ends being connected to the hole edge). The protruding piece with closed ends may be rendered elastically depressible without any difficulty.

INDUSTRIAL APPLICABILITY

In a capacitor including a capacitor element unit surrounded by first and second busbars arranged in cross section in a substantially horizontally flipped, rectangular C-like shape and also including elastic protruding pieces for absorption of tolerances among the vertical widths of capacitor elements, this invention provides an advantageous technology for better assembling workability that enables smooth and easy insertion of the capacitor element unit without interference of the protruding pieces and without major changes of a soldering jig.

REFERENCE SIGNS LIST 1 capacitor element
1a first electrode surface of capacitor element
1b second electrode surface of capacitor element
2A first electrode surface of capacitor element unit
2b second electrode surface of capacitor element unit
11 first electrode terminal
11a protruding piece for connection (connecting protrusion)
11b cutout hole
12 lateral side coupler
13 overhang
14 first connection terminal
21 second electrode terminal
24 second connection terminal
30 exterior resin (coating resin)
31 sheet-like insulating member
B1 first busbar
B2 second busbar
U capacitor element unit

The invention claimed is:

1. A manufacturing method for a capacitor, the capacitor, comprising:
a capacitor element unit comprising electrode surfaces having different polarities on both end sides thereof;
a first busbar and a second busbar respectively connected to the electrode surfaces; and
a coating resin that covers all of the capacitor element unit and that partly covers the first and second busbars,
the second busbar comprising:
a second electrode terminal connected to one of the electrode surfaces; and
a second connection terminal extended from the second electrode terminal,
the first busbar comprising:
a first electrode terminal connected to the other one of the electrode surfaces;
a lateral side coupler extended from the first electrode terminal along a lateral surface of the capacitor element unit;
an overhang extended from the lateral side coupler in a manner that closely overlaps the second electrode terminal; and
a first connection terminal extended from the overhang,
at least one of the first electrode terminal and the second electrode terminal comprising a connecting protrusion, the connecting protrusion being elastically depressible in response to contact with the electrode surface of the capacitor element unit inserted from an opposite side of the lateral side coupler across a space between the first electrode terminal and the second electrode terminal,
the manufacturing method comprising:
a first step of setting the first busbar on a soldering jig;
a second step of inserting the second busbar from a lateral side, with the second electrode terminal being positioned to follow a lower surface of the overhang of the first busbar; and
a third step of inserting the capacitor element unit from a lateral side into a space between the first electrode terminal and the second electrode terminal,
the third step further comprising:
inviting at least one of the electrode surfaces to make sliding contact with the connecting protrusion to elastically depress the connecting protrusion during the insertion of the capacitor element unit; and
pushing the connecting protrusion against the at least one of the electrode surfaces using an elastic restoring force of the protrusion.

* * * * *